United States Patent
Huang et al.

(10) Patent No.: US 10,632,549 B2
(45) Date of Patent: Apr. 28, 2020

(54) BLANKING AND TRIM DIE INCLUDING AN INTEGRATED POWER GRINDING TOOL

(71) Applicant: FORD MOTOR COMPANY, Dearborn, MI (US)

(72) Inventors: Liang Huang, Troy, MI (US); Evangelos Liasi, Royal Oak, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 560 days.

(21) Appl. No.: 15/380,347

(22) Filed: Dec. 15, 2016

(65) Prior Publication Data

US 2018/0169774 A1    Jun. 21, 2018

(51) Int. Cl.

| | |
|---|---|
| *B21D 19/00* | (2006.01) |
| *B23D 15/04* | (2006.01) |
| *B23D 33/00* | (2006.01) |
| *B21D 28/02* | (2006.01) |
| *B21D 21/00* | (2006.01) |
| *B21D 24/16* | (2006.01) |
| *B24B 27/033* | (2006.01) |

(52) U.S. Cl.
CPC .......... *B23D 15/04* (2013.01); *B21D 19/005* (2013.01); *B21D 21/00* (2013.01); *B21D 24/16* (2013.01); *B21D 28/02* (2013.01); *B23D 33/00* (2013.01); *B24B 27/033* (2013.01)

(58) Field of Classification Search
CPC ...... B23D 15/04; B23D 33/00; B24B 27/033; B21D 28/02; B21D 24/16; B21D 19/005; B21D 21/00; Y10T 29/49996; Y10T 29/49998
See application file for complete search history.

(56) References Cited

U.S. PATENT DOCUMENTS

| | | | |
|---|---|---|---|
| 4,477,537 A | 10/1984 | Blase et al. | |
| 6,401,510 B1 * | 6/2002 | Morse | B26D 3/085 72/327 |
| 2007/0173183 A1 | 7/2007 | Keene et al. | |

FOREIGN PATENT DOCUMENTS

| | | |
|---|---|---|
| CN | 2693372 Y | 4/2005 |
| CN | 101391386 A | 3/2009 |
| CN | 103706889 A | 4/2014 |
| CN | 203581984 U | 5/2014 |
| CN | 204053684 U | 12/2014 |
| DE | 4015052 A1 | 11/1991 |
| GB | 1135663 A | 12/1968 |
| JP | 3469929 B2 * | 11/2003 |

* cited by examiner

*Primary Examiner* — Sarang Afzali
*Assistant Examiner* — Ruth G Hidalgo-Hernandez
(74) *Attorney, Agent, or Firm* — Vincent Mastrogiacomo; Brooks Kushman P.C.

(57) ABSTRACT

An apparatus for trimming a sheet metal panel in a die set. A grinding tool including a grinding wheel driven by a rotary drive is used to grind away a shear affected zone from the trimmed edge formed by the trim steel. The grinding tool is disposed within a cavity defined by the reciprocating die and is oriented to grind away a shear affected zone as the reciprocating die moves the grinding tool into engagement with the trimmed edge.

7 Claims, 4 Drawing Sheets

BLANKING AND TRIM DIE INCLUDING AN INTEGRATED POWER GRINDING TOOL

TECHNICAL FIELD

This disclosure relates to sheet metal trimming and blanking dies that include a grinder for finishing a trimmed edge to eliminate edge cracking.

BACKGROUND

Edge cracking occurs along a blank edge that is strained by shearing in a trim operation and is one of the failure modes for stamping processes. The edge cracking phenomenon is more commonly observed AHSS and Aluminum applications. In draw operations, edge stretch may be observed, for example, in body side outer assemblies, door inner panels and developed blank structural panels. Edge cracking due to stretch flanging commonly occurs in secondary forming (e.g. reform/flange die etc.) operations. A developed blank or hole/cut-off after a drawing operation may be processed in a trim die, blanking die or trim/pierce die.

Referring to FIG. 1, one example of a prior art trim die set 10' is shown in FIG. 1 is diagrammatically illustrated that includes a pad 12' that clamps a sheet metal blank 14' against a first die 16'. A second reciprocating die 18' includes a trim steel 20' moved by the second reciprocating die 18' in a press (not shown) to trim the sheet metal blank 14' along a trimmed edge. Blanking and trimming processes are shearing processes. Shearing creates a work-hardened area at the trimmed edge and may create micro-cracks along the sheared edge. Work-hardening and micro-cracks reduce ductility and cause edge cracks in subsequent forming operations.

In an attempt to improve edge stretch characteristics, process parameters such as cutting tool clearance may be adjusted. Entirely different processes have been proposed to trim or blank work pieces such as shaving, bevel shearing or fine blanking. The other proposed processes have only achieved limited improvement in reducing edge cracks or add cost to the manufacturing process.

This disclosure is directed to solving the above problems and other problems as summarized below.

SUMMARY

According to one aspect of this disclosure, an apparatus for trimming a sheet metal panel is disclosed that comprises a pad for clamping a sheet metal panel to a first die and a second die retaining a trim steel for reciprocation relative to the die. The trim steel forms a trimmed edge on the panel. A grinding tool including a rotary drive and a grinding wheel is partially disposed in a cavity defined by the second die. The grinding wheel is rotated by the rotary drive to grind a shear affected zone from the trimmed edge.

According to other aspects of this disclosure, the rotary drive and the grinding wheel are operatively connected on a rotatable shaft. The rotary drive may further comprise a motor and a gear set operatively connected to the grinding wheel for rotating the grinding wheel. A clutch may be operatively connected between the motor and the grinding wheel for selectively disengaging the grinding wheel from the motor.

The grinding wheel may remove an arcuate section having a maximum depth into the plane of the panel of between 5 and 10% of the thickness of the panel from the trimmed edge. The panel may include a trim affected zone and the grinding wheel may be used to remove an arcuate section from the trimmed edge.

The grinding wheel may be in the shape of a frustum of a cone, wherein the minimum diameter of the cone engages the panel first after the trim steel forms the trimmed edge, and wherein the amount of material removed by the grinding wheel increases as the diameter of the portion of the grinding wheel engaging the panel increases. Alternatively, the grinding wheel may be cylindrical.

The grinding wheel may be moved reciprocally with the second die to engage the panel after the trim steel forms the trimmed edge to remove between 5 and 10% of the gauge thickness of the panel from the trimmed edge in the plane of the panel.

The trimming apparatus may further comprise a spring biasing device, a drive, or a cam set operatively connected to the grinding wheel that moves the grinding wheel perpendicularly relative to a direction of reciprocation of the second die to engage and disengage the trimmed edge.

According to another aspect of this disclosure, a method is disclosed for trimming a sheet metal panel while the panel is clamped to a first die with a clamping pad. The panel is sheared with a trim steel retained by a second die to form a trimmed edge having a shear affected zone at the trimmed edge. The shear affected zone is removed with a grinding wheel while the clamping pad continues to clamp the panel to the first die.

The method may further comprise advancing, biasing, or moving the grinding wheel toward the edge of the panel after the shearing step in a first direction perpendicular to a second direction that the second die reciprocates in the shearing step. The grinding wheel may be moved with a spring, power cylinder, motor or cam set.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
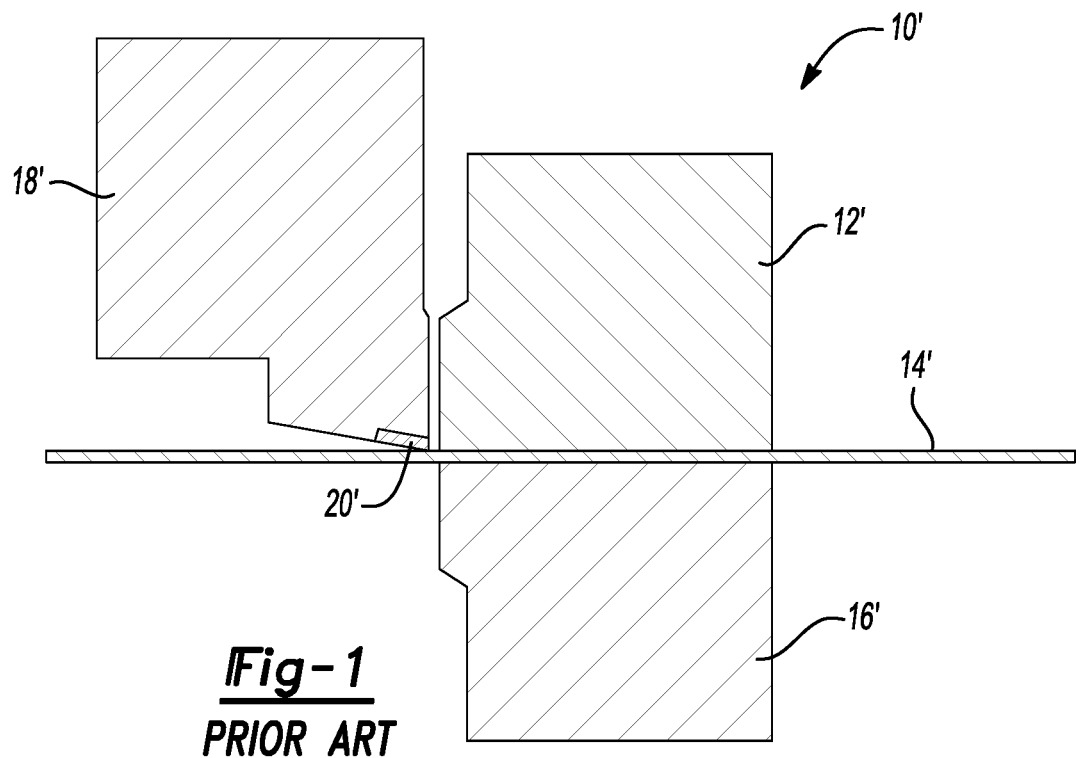
FIG. 1 is a diagrammatic cross-sectional view of a prior art trim die set.
Figure 2:
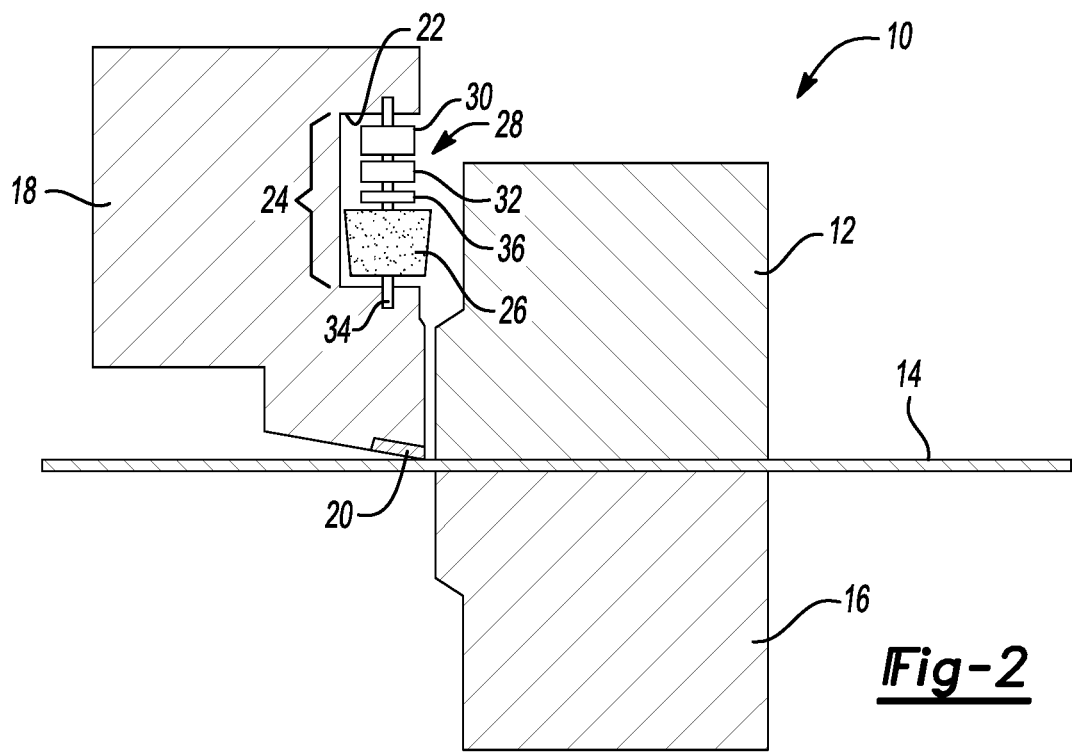
FIG. 2 is a diagrammatic partial cross-sectional view showing a grinding tool disposed in a recess or cavity of a reciprocally movable die.

Referring to FIG. 2, a trim die set 10 is generally identified by reference numeral 10. The trim die set 10 is made according to one embodiment of this disclosure and includes a pad 12 that clamps a panel 14 against a first, or stationary, die 16. A reciprocally movable die, or second die, 18 is shown to include a trim steel 20 that may be either integrally provided as a hardened part of the second die 18 or may be an insert assembled to the die 18 for trimming the panel 14. The second die 18 defines a recess 22 or cavity for receiving a grinding tool 24 is retained to grind off part of the sheet metal blank 14 after it is trimmed by the trim steel 20.

The grinding tool 24 includes a grinding wheel 26. The grinding wheel 26 in the embodiment shown in FIGS. 2-6 is a frustconical grinding wheel 26. The grinding wheel 26 is driven or rotated by a rotary drive generally indicated by reference numeral 28 includes a motor 30 that may be attached to a gear set 32. The motor 30 provides the rotational motion and the gear set 32 may be provided to increase the rotary speed of a rotatable shaft 34, or spindle. An optional clutch 36 may be provided to permit disengagement of the rotatable shaft 34 from the grinding wheel 26.

Figure 3:
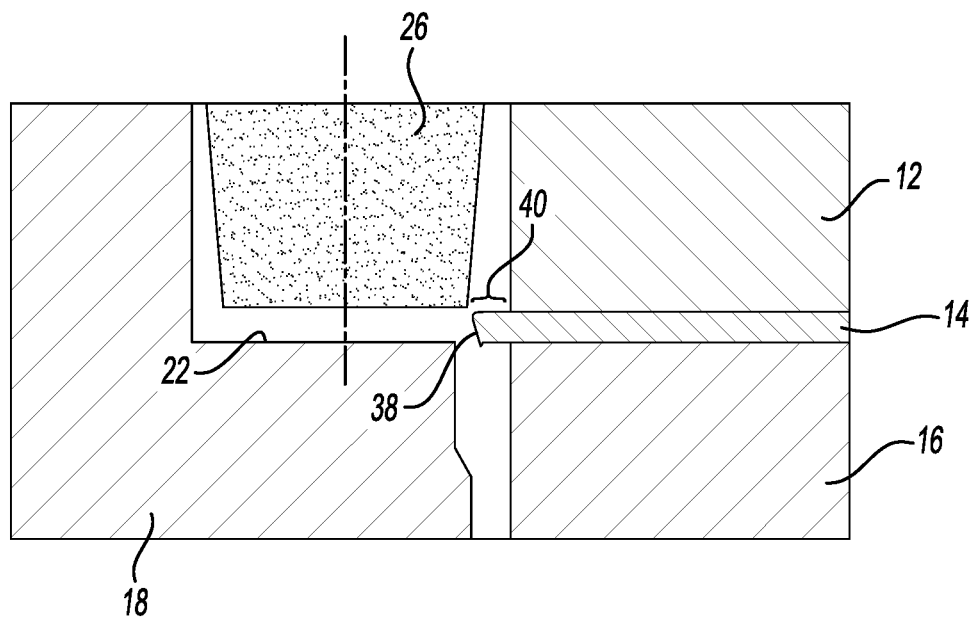
FIG. 3 is diagrammatic partially cross-sectional view showing a panel in the die after being trimmed but before grinding.

After the trim steel 20 trims the sheet metal blank 14, a trimmed edge 38 is formed on the sheet metal blank 14. A shear affected zone 40 is created by the shearing action of the trim steel 20 upon the sheet metal blank 14. The shear affected zone 40 extends a limited distance, i.e., less than 10% of the thickness gauge of the sheet metal blank 14. This distance may be different depending upon the shearing conditions and type of material being sheared by the trim steel 20. Refer to FIG. 3.

Referring to FIG. 3, the panel 14 is shown to have been trimmed to form a trimmed edge 38. A shear affected zone 40 is shown extending outwardly from the pad 12 and first die 16. The grinding wheel 26 is shown in the recess or cavity 22 of the second die 18 in position to be moved into engagement with the trimmed edge. The grinding wheel is rotated to grind away the shear affected zone 40 as the second die 18 continues to move downwardly in a reciprocating stroke to engage the trimmed edge 38.

Figure 4:
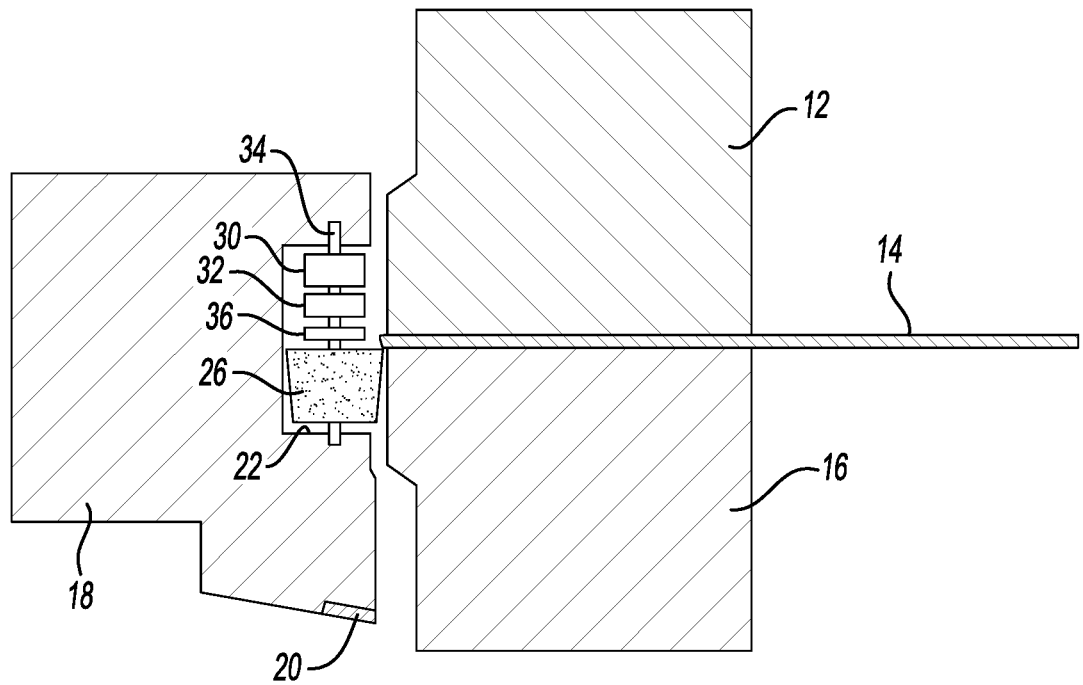
FIG. 4 is a diagrammatic partially cross-sectional view of a trim die set after a shear affected zone is ground off of the trimmed edge.
Figure 5:
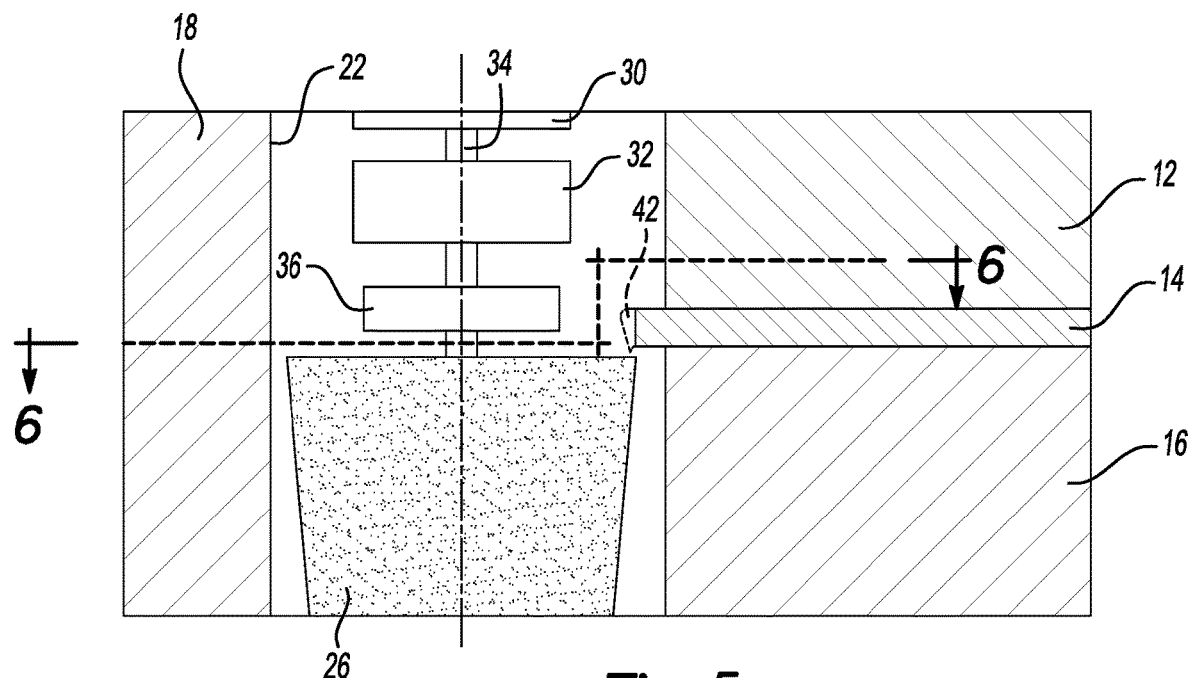
FIG. 5 is an enlarged diagrammatic partially cross-sectional view showing a trim panel after the shear affected zone is ground off of the panel.

Referring to FIGS. 4 and 5, the trimmed edge 38 is shown with the shear affected zone 40 removed. The motor 30 rotates the spindle 34 and the rotational speed may be increased by the gear set 32 that drives the grinding wheel 26. The grinding wheel is shown after having ground away the shear affected zone (shown in FIG. 3) from the panel 14.

Figure 6:
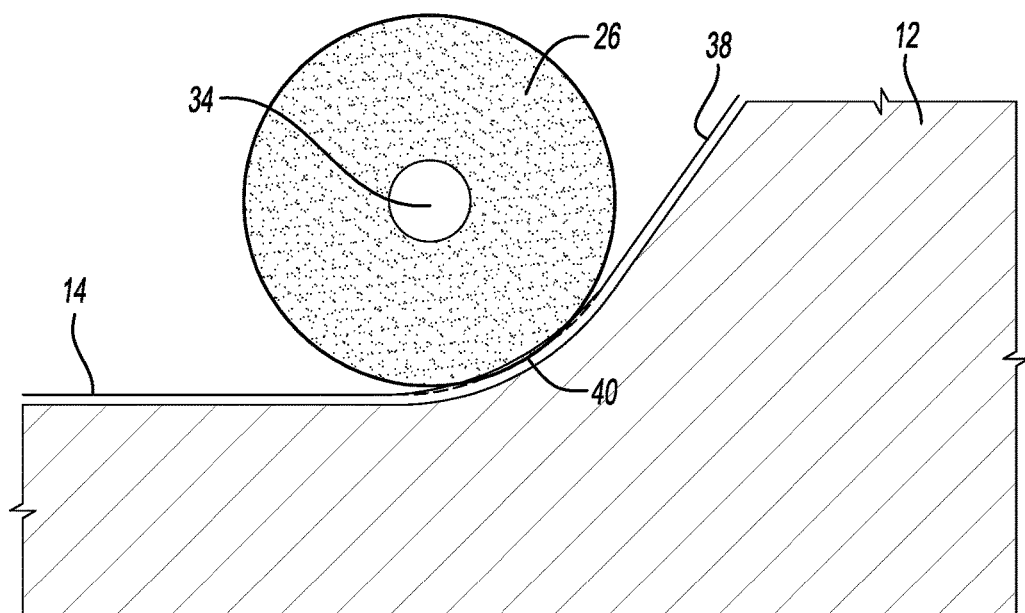
FIG. 6 is a diagrammatic cross-sectional view taken along the line 6-6 in FIG. 5.

Referring to FIG. 6, a cross-sectional view is taken through FIG. 5 to illustrate that the grinding wheel 26 grinds an arcuate portion of the trimmed edge 38. Small cracks and draw stresses are concentrated in the arcuate portion of the trimmed edge 38. The grinding wheel 26 is rotated on the spindle 34 to remove the shear affected zone 40 from the trimmed edge 38. The trimmed edge 38 extends inwardly from the pad 12 with the panel 14 overhanging the first die 16 (shown in FIG. 5 above).

Figure 7:
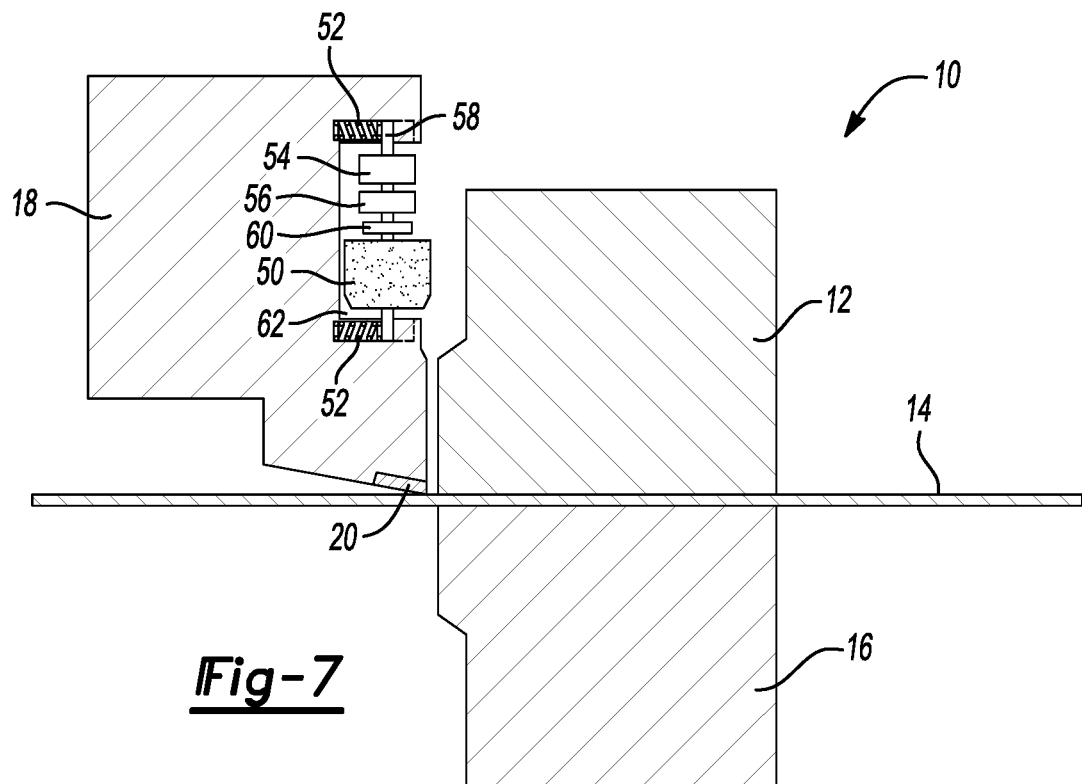
FIG. 7 is a diagrammatic partial cross-sectional view of a trim die set including an alternative embodiment of a grinding tool disposed in a cavity defined by the reciprocally movable trim die.

Referring to FIG. 7, an alternative embodiment of a trim die set 10 is shown. The same numbers for the trim die set 10 will be used with reference to the embodiment of FIG. 7, to the extent that they are the same as the reference numerals used to define common portions of a trim die set. The trim die set 10 includes the pad 12 that clamps the panel 14 against the first die 16. A second die 18 reciprocates a trim steel 20 to form a trimmed edge 38 (shown in FIGS. 5 and 6). In FIG. 7, a cylindrical grinding wheel 50 is used to perform the grinding function to remove the shear affected zone 48 from the trimmed edge 38. The cylindrical grinding wheel 50 may include a beveled lower end that functions as a lead-in surface as the grinding operation begins. A pair of springs 52 operatively engage and bias the grinding wheel 50, motor 54, gear set 56 and rotatable shaft 58 into engagement with the trimmed edge that will be formed after the trim steel 20 trims the panel 14. A clutch 60 may also be provided on the rotatable shaft 58. The second die 18 defines a cavity 62 that receives the cylindrical grinding wheel 50 and rotatable shaft 58 carrying the motor 54, gear set 56 and grinding wheel 50. The grinding wheel 50 is disposed within the cavity 62 but is extended outwardly by the biasing action of the springs 52 that bias the rotatable shaft 58 into engagement with the trimmed edge 38 formed as shown in FIGS. 4-6. The panel 14 is sheared by the trim steel 20 as the second die 18 is moved downwardly from the position shown in FIG. 7.

Figure 8:
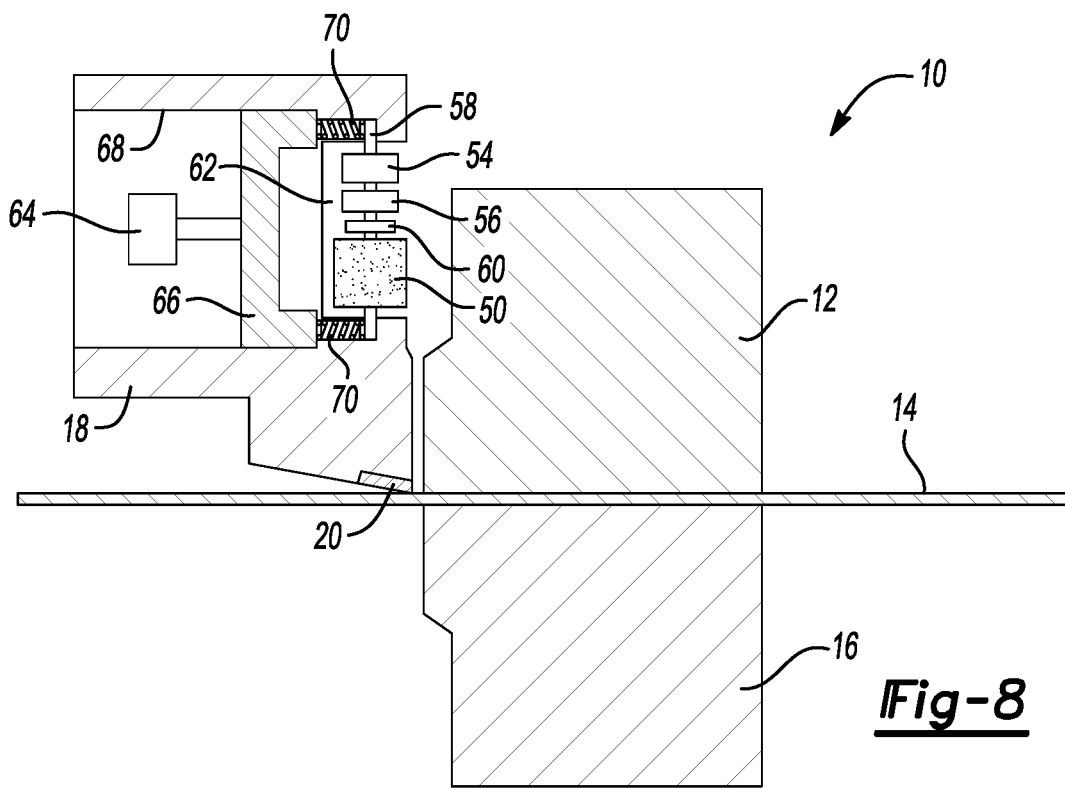
FIG. 8 is a diagrammatic partially cross-sectional view of another alternative embodiment of a trim die including a grinding tool including a linear drive for advancing and retracting the grinding tool relative to the trimmed edge.

Referring to FIG. 8, another alternative embodiment is shown that is similar to the embodiment of FIG. 7 and common reference numerals will be carried over to describe similar parts of the trim die set 10. Again, the pad 12 clamps the sheet metal panel 14 against the stationary die 16. The reciprocating die 18 defines a recess or cavity 62 in the die 18. As previously described with reference to FIG. 7, the cavity 62 partially houses the cylindrical grinding wheel 50, motor 54 and gear set 56 on a rotatable shaft 58. A clutch 60 is also shown attached to the rotatable shaft 58 for disengaging the motor 54 from the grinding wheel 50.

A linear drive 64 is diagrammatically illustrated in FIG. 8. It should be understood that the linear drive may be construed to be a diagrammatic representation of a motor, cam drive, or power cylinder that is used to advance a slide 66 in a linear direction toward and away from the trimmed edge of the panel 14. The grinding wheel 50 is advanced when vertically aligned with trimmed edge formed when the trim steel 20 shears the panel 14 to form a trimmed edge. The slide 66 is guided by a guide 68 that is provided within the second die 18. A pair of springs 70 are also shown to be disposed within the cavity 62. The springs 70 are return springs that retract the grinding wheel 50 by applying a biasing force on the slide 66.

In operation, the embodiment shown in FIG. 8 initially uses the trim steel 20 to trim the panel 14 while it is being held between the pad 12 and first die 16. The second die 18 is moved downwardly by a press (not shown) to cut a trimmed edge on the panel 14 with the trim steel 20. The downward movement of the die 18 continues until the grinding wheel 50 is in position to grind off a small portion (i.e., less than 10% of the thickness of the blank 14) from the trimmed edge. The grinding wheel 50 is rotated by the motor 54 with the rotary motion of the spindle 58 being provided through the gear set 56 and clutch 60 (if provided). When the grinding wheel 50 is aligned with the panel 14, the linear drive 64 moves the slide 66 into engagement with the springs 70. The grinding wheel is driven into the plane of the panel 14. The return springs 70 bias the slide 66 to a retracted position after the shear affected zone is removed from the trimmed edge.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of trimming a sheet metal panel comprising:
    clamping a sheet metal panel to a first die with a clamping pad;
    shearing the sheet metal panel with a trim steel retained by a second die, wherein the trim steel is reciprocated relative to the first die to form a trimmed edge having a shear affected zone at the trimmed edge; and
    grinding the shear affected zone with a grinding wheel disposed in a cavity defined by the second die, wherein the grinding wheel is reciprocated with the second die to grind the shear affected zone after the trim steel forms the trimmed edge while the clamping pad continues clamping the panel to the first die.

2. The method of claim 1 wherein the shear affected zone includes cracks and is work hardened during the shearing step.

3. The method of claim 1 further comprising:
    advancing the grinding wheel toward the edge of the panel after the shearing step in a first direction perpendicular to a second direction that the second die reciprocates in the shearing step.

4. The method of claim 1 further comprising:
    biasing the grinding wheel toward the edge of the panel after the shearing step with a spring in a first direction perpendicular to a second direction that the second die reciprocates in the shearing step.

5. The method of claim 1 further comprising:
    moving the grinding wheel toward the edge of the panel after the shearing step with a motor in a first direction perpendicular to a second direction that the second die reciprocates in the shearing step.

6. The method of claim 1 further comprising:
    moving the grinding wheel toward the edge of the panel after the shearing step with a cam linked to the second die in a first direction perpendicular to a second direction that the second die is reciprocated in during the shearing step.

7. The method of claim 1 further comprising:
    moving the grinding wheel toward the edge of the panel after the shearing step with a power cylinder in a first direction perpendicular to a second direction that the second die reciprocates in the shearing step.

* * * * *